C. BARNARD AND H. H. GATES.
SUN FRUIT DRIER.
APPLICATION FILED MAR. 19, 1918. RENEWED NOV. 9, 1920.
1,362,216.
Patented Dec. 14, 1920.
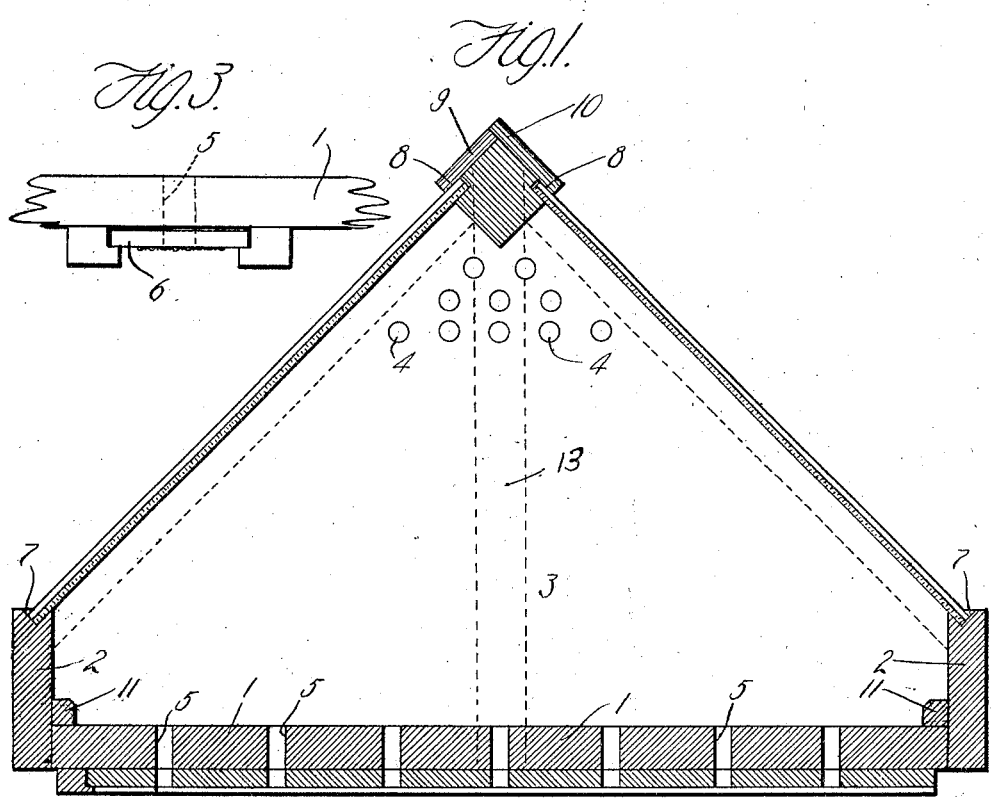
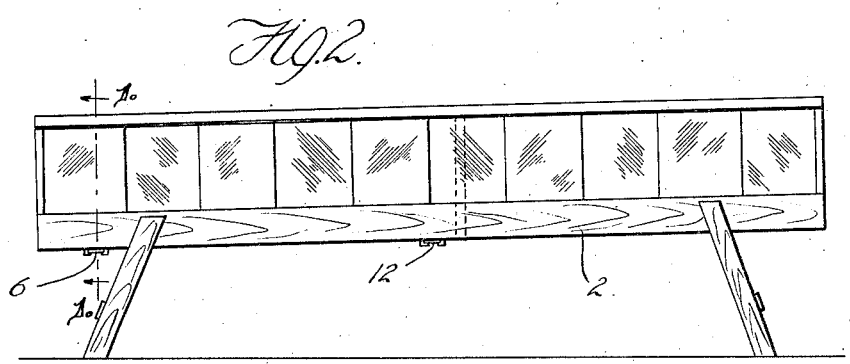
Inventors
Charles Barnard and
Harry H. Gates
by
their Attorney

UNITED STATES PATENT OFFICE.

CHARLES BARNARD AND HARRY H. GATES, OF PASADENA, CALIFORNIA.

SUN FRUIT-DRIER.

1,362,216.  Specification of Letters Patent.  Patented Dec. 14, 1920.

Application filed March 19, 1918, Serial No. 223,443. Renewed November 9, 1920. Serial No. 422,959.

*To all whom it may concern:*

Be it known that we, CHARLES BARNARD and HARRY H. GATES, citizens of the United States, residing at Pasadena, in the county of Los Angeles and State of California, have invented a certain new and useful Improvement in Sun Fruit-Driers, of which the following is a full, clear, concise, and exact description.

Our invention relates to the art of evaporating the moisture from fruit and vegetables by the agency of the sun's controlled heat and a current of air also controlled and maintained to circulate among and about the articles being dried to produce the best results according to the character, relative moisture, and degree of desiccation desired; and our invention is especially intended for the use of individual households, so that each family, at the season of ripening and abundance, may preserve the surplus garden and orchard products, to be available for use at times when fresh fruits are not to be had conveniently, or when they are scarce and more costly.

In order that this work may be done in the home and by those of only moderate skill and experience, as distinguished from the work by experts on large ranches, or in drying plants, it is evident that the apparatus itself and the method or process of employment should be of quite moderate cost and readily and easily applied and understood; and the resulting products, being primarily intended for home consumption by those accustomed to products fresh gathered, must preserve and maintain the original flavors and characteristics so as to satisfy the educated palate of the most fastidious.

As will be later more particularly pointed out, our invention collects and intensifies the sun's heat and employs these high temperatures in drying all the ordinary kinds of fruits and vegetables and other foods, destroying all germs of decay and making it possible to save and preserve food products quickly, cheaply, under perfectly natural conditions, and without the use of sulfur or any other chemical or preservative. Moreover, all food treated according to our invention is absolutely free from injury by wind, rain, dust, birds, flies and other insects.

Speaking generally our sun fruit drier apparatus consists of a long shallow wooden box with a glass roof, designed to stand out of doors, and being inclined at an angle toward the south to face the sun a draft is caused like the natural draft of a chimney.

In the accompanying drawing which is illustrative of our invention: Figure 1 is a vertical sectional view taken on line 1—1 of Fig. 2, of a sun fruit drier embodying our invention; Fig. 2, is a side elevation thereof; and Fig. 3, is a detail view illustrative of the means for controlling and regulating the intake of the air to adjust the draft according to any special requirements.

Like parts are indicated by like figures of reference throughout the several figures.

The floor 1, of our standard size, may be of Oregon pine, say $1\frac{3}{8}''$x$17\frac{3}{4}''$x10' 0''; the sides 2, may be of the same wood, of the same length and thickness each, and each about three inches in height; the end pieces may be of the same thickness and about ten inches in height, and each will be about eighteen inches in length. It will be observed that the end piece 3 which is at the more elevated end of the drier, is provided with the vents, or openings, indicated at 4 which may be say, nine in number and three-fourths of an inch in diameter. In the floor and near the lower end of the drier, we have provided openings of $\frac{3}{4}$ inch in diameter and seven in number in this instance, indicated in Fig. 1 at 5, 5, and so forth. A slide serving as a valve, indicated at 6, of Fig. 3, is provided with openings corresponding with the openings 5, 5, and so forth, which latter openings when the slide is pushed in as shown, are caused to register with the openings in the floor. The openings in the slide should be provided with screens as in the case of the outlet opening 4, to guard against insects, dust and so forth.

The upper edges of the side pieces are provided with troughs or channels as indicated at 7, 7, which are adapted to support the lower edges of the glass of the roof, as shown. The ridge-piece may be formed from a scantling $1\frac{1}{2}''$x$1\frac{1}{2}''$x10' 0'' cut at the lower portions of the upper faces to form channels say $\frac{1}{4}''$x$\frac{1}{2}''$ to accommodate the upper edges of the panes of glass of the roof, as indicated at 8, 8, and to the said upper faces are secured the strips or saddles 9 and 10. Midway in the length of the ridge we place a center post 13 to support the ridge from the floor.

The rafters may be of strips $1\frac{3}{16}''$x$1\frac{1}{4}''$ and serve to securely brace and hold the ridge-piece to the side pieces as indicated; the legs it will be observed are made longer at one end of the drier than at the other end, this for the purpose of raising one end higher than the other end, in the standard size which we are describing, one end may be eight inches more or less higher than the other end, this giving sufficient inclination in the distance of ten feet to cause the desired current or draft of air when the sun is shining on the roof.

In this standard size, twenty panes of window glass are required, twelve of the lights being 12"x12" and eight of the lights being 12"x14", and we insert these panes in the channels 7 and 8 to overlap at the edges and hence be readily removable.

The glass roof is thus made approximately air tight, or sufficiently so to cause the long box of moderate cross section to act after the manner of a chimney, and so direct the current of air, entering at the lower end, throughout the length of the drier.

It will be noted that supports for the fruit trays are provided as indicated at 11, 11.

In localities where there is less sunshine than in southern California, or upon days when the sun's heat is only of moderate intensity, we have found it desirable to provide additional air inlets as indicated at 12, Fig. 2, which may be of the same size and construction as air inlets 5, 5, previously described. Under ordinary conditions, however, the single air control 5, 5, at the lower end of the floor of the box will be sufficient; but on damp or cool days the additional set of openings, such as we have indicated, we find desirable.

The legs at the lower end may be, say 2' 4" in length, while the legs at the upper end may be, say 3' in length so as to incline the roof so as to face the sun.

The rise in temperature within the box, under normal conditions, will be from 80 to 100 degrees Fahrenheit above the outside temperature; the temperature inside the box may thus be maintained as high as is desirable, say up to 198 degrees Fahrenheit, though on average days the temperature within the box will be, say only from 165 to 180 degrees.

For drying and curing fish we provide special slotted trays.

In the above specification we have described a drier of the size and particular form that we have found best meets the requirements of a private family; but it will be understood that the size of the drier may be modified according to circumstances.

Having thus described our invention, we claim as new and desire to secure by Letters Patent:

1. In a fruit drier, the combination of a box-like structure of considerable length relative to its width converging at the top, end pieces having inclined sides, a ridge piece supported by said end pieces and having channels or grooves therein, the sides of said box-like structure also having channels or grooves, the drier between said sides and ridge piece being formed of glass fitted into the channels or grooves in said sides and ridge piece and slanting toward each other from opposite sides, said drier being adapted to be inclined to cause the inclined glass roof to face the sun and having inlet openings near the bottom thereof and outlet openings near the top of its upper end, whereby the atmosphere within the box is heated by the sun's rays and caused to circulate to cure the food products placed within the box.

2. In a fruit drier the combination of a box-like structure of considerable length relative to its width, comprising a bottom, low side members having grooves or channels therein, end pieces of substantially triangular shape connecting said side members at the ends thereof, a ridge piece supported by the upper ends of said triangular end pieces and having grooves or channels therein, the drier between said sides and ridge piece being formed of glass removably fitted into the channels or grooves in said sides and ridge piece and slanting toward each other from opposite sides, said drier being adapted to be inclined to cause the inclined glass roof to face the sun and having inlet openings near the bottom thereof and outlet openings near the top of its upper end, whereby the atmosphere within the box is heated by the sun's rays and caused to circulate to cure the food products placed within the box.

In witness whereof, we hereunto subscribe our names this 11th day of February, A. D., 1918.

CHARLES BARNARD.
HARRY H. GATES.